Patented July 2, 1940

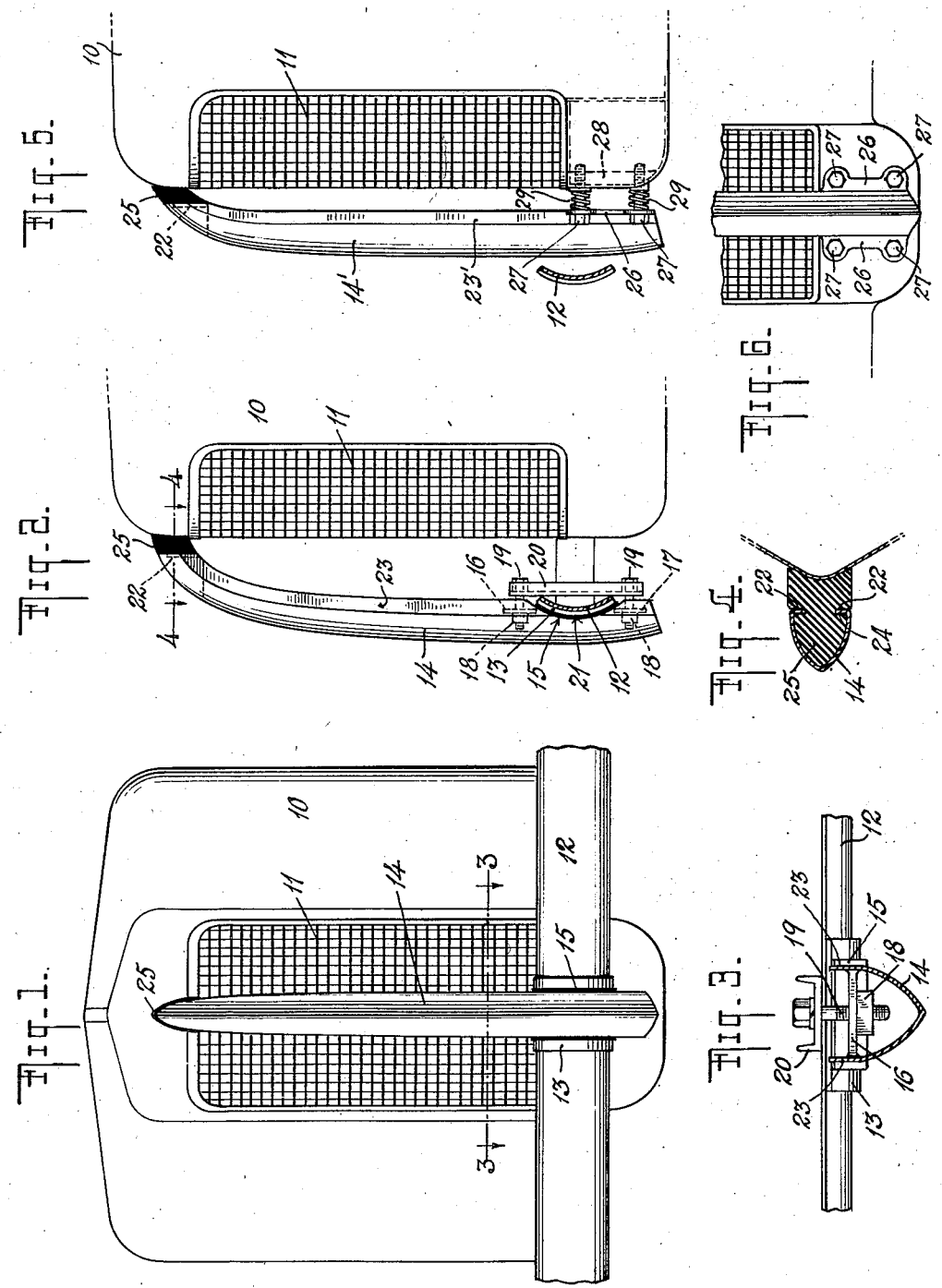

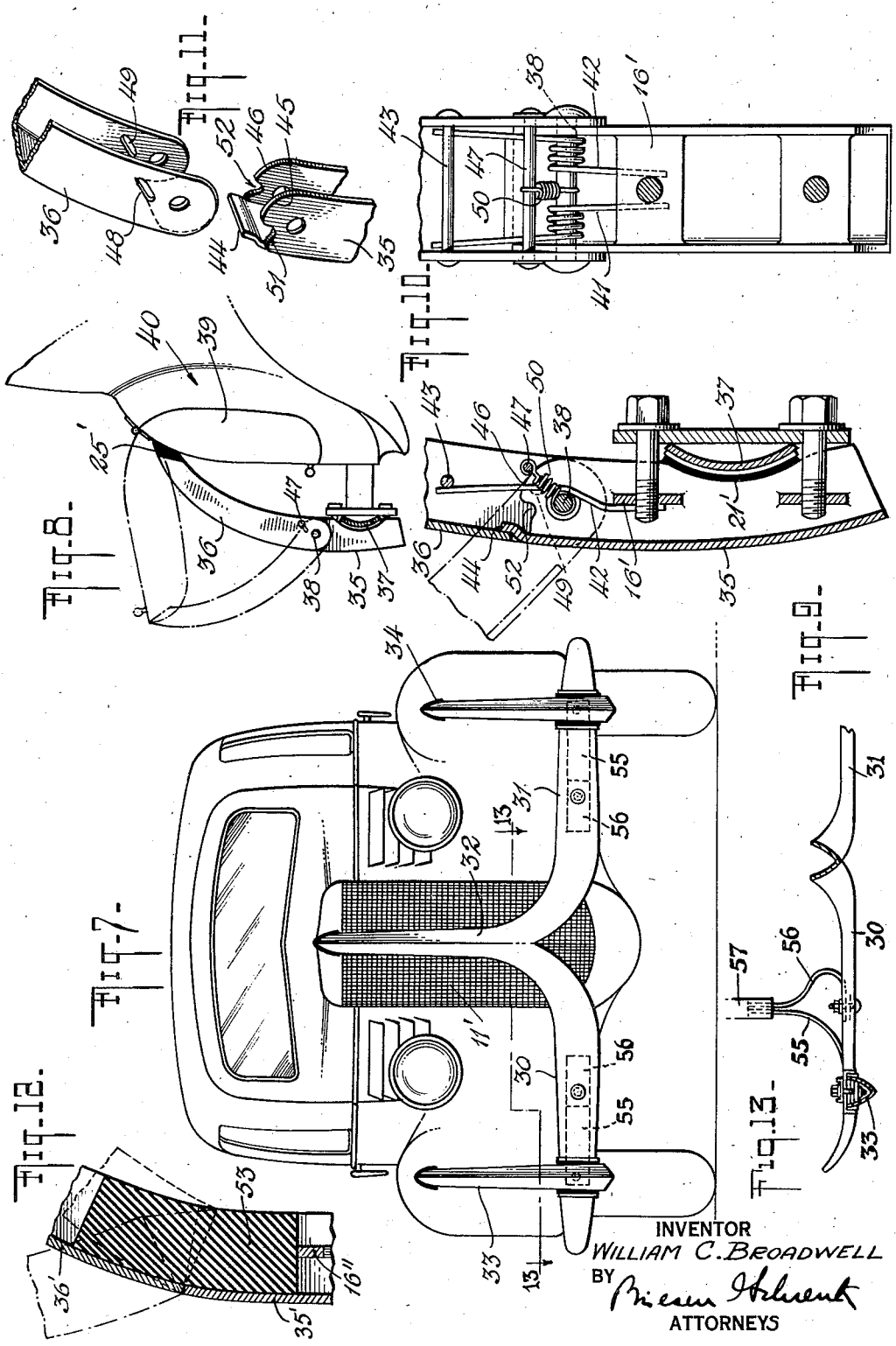

2,206,023

UNITED STATES PATENT OFFICE 2,206,023

VEHICLE GUARD

William C. Broadwell, New York, N. Y.

Application August 30, 1938, Serial No. 227,475

7 Claims. (Cl. 293—55)

This invention relates to improvements in guards for vehicles and the principal object of the invention is to provide a guard which will prevent interlocking with bumpers of other cars and will additionally afford protection not only to those portions of the vehicle which are positioned adjacent to the bumper thereof but also those portions of the vehicle which are beyond the protection of the bumper but which nevertheless are often subjected to destructive impacts during the usage of the vehicle.

Another object of the invention is to provide an improved bumper guard having at one end means whereby it may be readily attached to the bumper or a fixed portion of the vehicle and having at its other end means to yieldingly associate it with a fixed portion of the vehicle.

A further object of the invention is to provide an improved guard which will afford protection to a greater portion of the vehicle than is capable of those now in use and which can be incorporated as an integral element in the design of the vehicle to enhance the latter's appearance.

Other objects as well as the advantages of the invention will become more apparent after a perusal of the following description, taken in connection with the accompanying drawings in which Fig. 1 is a front elevation of a bumper guard constructed in accordance with the invention and illustrating one method by which the guard may be mounted on a vehicle; Fig. 2 is a side elevation of the parts shown in Fig. 1; Fig. 3 is a section taken along the line 3—3 of Fig. 1; Fig. 4 is a section taken along the line 4—4 of Fig. 2; Fig. 5 is a side elevation of a modified form of the invention; Fig. 6 is a front view of the lower portion of the guard illustrated in Fig. 5; Fig. 7 is a front elevation of a vehicle bumper embodying the principles of the invention and bearing a pair of bumper guards arranged for protection of the vehicle fenders; Fig. 8 is a modification illustrating the manner in which the guard of this invention may be associated with the rear end of a vehicle; Fig. 9 is an enlarged sectional view of a portion of the guard shown in Fig. 8; Fig. 10 is a front elevation of that portion of the guard shown in Fig. 9; Fig. 11 is a perspective view of the hinged end portions of such guard, the parts being shown in disassembled relation; Fig. 12 is a partial vertical section of another embodiment of the invention and Fig. 13 is a section taken along the line 13—13 of Fig. 7.

Referring more particularly to Figs. 1 to 4 of the drawings, the numeral 10 designates the hood of an automobile, which in accordance with modern design extends forwardly of the radiator of the automobile and surrounds a grill-work 11 positioned in front of such radiator. The front bumper of the automobile is designated by the numeral 12. Mounted on the strengthened central section 13 of the bumper is a bumper guard 14 which extends transversely of the bumper from a point below the latter, upwardly above the grill-work 11 of the automobile. The bumper guard 14 is hollow and has a substantially V-shaped cross section, as is shown more clearly in Fig. 3, which tapers towards its upper end, the latter of which is curved inwardly towards the front end of the hood, as is shown in Fig. 2.

The rear edges of the bumper guard illustrated in Figs. 1 to 4 are provided with a pair of aligned concaved surface portions 15 which are positioned adjacent to the lower end of the guard and are adapted to engage with the front face of the central section 13 of the bumper. The surface portions 15 are preferably so shaped that the guard can be mounted readily on the bumpers of all popular makes of cars and can be adjusted relative thereto. Disposed within the hollow bumper and positioned closely adjacent to the upper and lower ends of the surface portions 15 are a pair of cross brackets 16 and 17 which are preferably welded to or integrally formed with the guard. The brackets 16 and 17 are each provided with a centrally disposed boss 18 threaded to receive the bolts 19 which extend through the channel-shaped cross bar 20, the latter of which is seated on the rear edges of the bumper, as can be readily seen in Figs. 2 and 3 of the drawings. Intermediate the bumper and the surface portions 15 of the guard is a cushion member 21 made of rubber, leather, or other suitable material, to enable small movement of the guard relative to the bumper without injury to the latter and to prevent vibratory noise between such parts.

The upper rearwardly extending end of the bumper guard is provided with a pair of opposed inwardly extending flange members 22 which are preferably formed by extending the straight rear edge portions 23 of the guard (see Figs. 2 and 3) beyond the body thereof and then turning such extensions inwardly into opposed relation. The flange members 22 engage with the side grooves 24 of a rubber plug 25 which is forced into position in the open upper end of the guard and is securely held in such position by the flange members 22. The plug 25 extends rearwardly from the guard 14 to engage or extend into close proximity to the front surfaces of the hood and such extending portion of the plug is of sufficient dimensions to provide a satisfactory cushioning or shock absorbing member intermediate the guard and the hood. The rear face of the plug 25 is preferably shaped to conform to the shape of the hood at this point so that the entire surface of such face is in engagement with the exterior surface of the hood, as is shown in Fig. 4 and is normally maintained in such engagement or close proximity by the parts which attach the guard to the bumper.

It will be apparent from the foregoing that my improved bumper guard will satisfactorily accomplish the purposes for which it was intended. Thus, due to the length of the guard 14 and the fact that it bridges so long a span and is at its free end in contact with or adjacent to a part of the car body, the bumper parts of other cars even when located at a higher elevation on such other cars, cannot pass around the guard 14 or over the top thereof so as to become interlocked with the guard 14. It is one of the commonest experiences when the bumpers are provided with vertical guards which are relatively short, for the bumper of another car to clamp over the top of such guards, bringing about an interlocked condition. Numerous structures have been devised to enable such interlocked bumpers to be unlocked but in the structure of the present application the interlocking cannot take place in the first instance because the bumper of an adjacent car cannot pass to the rear of guard 14. Furthermore, in the new arrangement, should there be an impact against the bumper 12, or the guard 14, the major force of such impact will be taken up by the bumper 12, tending to press the lower part of the guard 14 in the direction of the car body, the upper part of the guard meanwhile at 25 acting as a pivot for any inward motion of the lower part of the guard 14. Due to the new arrangement, however, the pivotal contact is not a rigid one but is in the nature of a wiping pivot so that the effects of shock received at the bumper region are by this arrangement primarily taken up through the bumper structure, while the component forces transmitted to the guard are mainly dissipated through the wiping pivotal movement of the shock-absorbing plug along and against the surface of the engaged body part. Even a severe blow or impact in the bumper region will not be transmitted so as to dent the hood portion of the car engaged by the resilient member 25. In the meantime the grill-work 11 will be protected throughout its entire height against destruction or indentation by another vehicle.

It is also within the contemplation of the invention to mount the guard thereof upon the body of the vehicle instead of on the bumper. In this embodiment of the invention which is illustrated in Figs. 5 and 6, the guard 14' is preferably provided with two outwardly extending flanges 26 formed from the straight rear edge portions 23' thereof and each of which is provided with a pair of spaced apertures through which the bolts 27 extend. The bolts 27 at their rear ends are secured in threaded engagement with the threaded bosses provided on a supporting bracket or bar 28. The bracket or bar 28 may be secured in any suitable manner to the under part of the hood or to the frame of the vehicle. Mounted on each bolt intermediate its associated boss of the bracket 28 and its associated flange 26 is a compression spring 29 adapted to yieldingly resist forces acting on the guard 14'.

It will be apparent by those skilled in the art that other changes and modifications in the shape, construction, and arrangement of the guard may be made without departing from the spirit and scope of the invention. For example, the guard need not be spaced from the grill work but may be partly disposed in a central channel extending longitudinally thereof. The advantages of this arrangement are that the guard will be less conspicuous and can be included more readily as an integral element in the design of the vehicle.

The guard may also be made as an integral part of the bumper as is indicated in Fig. 7 of the drawings. In this embodiment of the invention the bumper proper is composed of two horizontally disposed arms 30 and 31 which are secured at their outer ends by two sets of springs 55 and 56 to the frame 37 of the vehicle in the usual manner, such springs which are of the usual construction, being indicated by the dotted lines in Fig. 7, while Fig. 13 shows a top plan view of the set of springs 55 and 56 connecting the horizontally disposed arm 30 to the frame 57, the construction and arrangement of the set of springs supporting the arm 31 being similar in all respects. The inner ends of the arms 30 and 31 converge upwardly and merge into a central vertically disposed guard section 32 which extends upwardly above the radiator grill work 11' of the vehicle, the upper end of such section being curved inwardly towards the hood of the car and being provided with a rubber shock-absorbing member in the same manner as the guard illustrated in Figs. 1 and 2 of the drawings, such member being maintained in pivotal wiping engagement with the hood of the car above the grill-work 11' by the sets of springs supporting the arms 30 and 31. Preferably also the horizontally disposed arms 30 and 31 carry fender guards 33 and 34, respectively, which are similar in construction and attached to such arms in the same manner as the guard illustrated in Figs. 1-4 of the drawings, and function to prevent interlock with another car, to prevent injury to and indentation of the fenders and to completely bridge the space between the bumper region and the car body portion where it is engaged by the resilient member with a wiping pivotal contact,—all as has been described in connection with the functioning of the structure shown in Figs. 1-4.

The embodiment illustrated in Figs. 8 to 10 of the drawings is particularly adaptable for the rear end of a vehicle. In this embodiment the guard is composed of a lower base section 35 and an upper section 36, the base section 35 being secured to the rear bumper 37 of the vehicle in a manner similar to that described hereinabove with respect to the guard 14 and the front bumper 12 and the upper section 36 being hingedly connected to the base section 35 by means of a pin 38 which extends transversely through both sections, as is shown more clearly in Fig. 10. The upper section 36 is arcuately shaped so that its upper end extends toward the door 39 of the trunk portion 40 of the vehicle and like the guard 14 is provided at its upper end with a rubber shock absorber 25' adapted to engage with the exterior surfaces of the door 39. The upper section 36 is normally maintained in this position (see Fig. 8 of the drawings) under the influence of a pair of springs 41 and 42 which are mounted on the pin 38 and have their lower ends resting against the interior surface of the bracket 16' and their upper ends resting against a pin 43 extending transversely through the upper section 36 and disposed above the pin 38. Entry into the trunk portion 40 of the vehicle, however, can be accomplished readily by pulling back the upper section 36 about the pin 38 and against the tension of the springs 41 and 42 to enable the door 40 to be swung open, as is indicated by the dotted lines in Fig. 8 of the drawings. When the parts are in their normal position with the member 25' in engagement with the door 39, in the latter's closed position, the bottom edge of the rear surface of the upper section 36 overlies the inwardly disposed offset edge portion 44 of the lower or base section 35.

The upper side edges 45 and 46 of the base section 35 are in the nature of guide surfaces upon which ride a transverse pin 47 carried by the upper guard section 36. As is shown more clearly in Figs. 9–10, the pin 47 extends through a pair of elongated openings 48 and 49 provided in the sides of the upper section 36 and is yieldingly maintained in engagement with the side edges 45 and 46 of the base section by means of a spring 50 which is connected at one end to such pin and at its other end to the pin 38, such latter end of the spring being disposed between the springs 41 and 42. The side edges 45 and 46 are provided with a pair of notches 51 and 52, respectively, into which the pin 47 drops when the upper section 36 is pivoted to the position indicated by the dotted lines in Fig. 8 of the drawings. The positions of the notches 51 and 52 are so arranged that when the pin 47 is latched therein the upper section 36 is held in position to hold and support the door 39 in its opened position (see Figs. 8 and 9).

Instead of hingedly connecting the lower base section and the upper section of the guard in the manner illustrated in Figs. 8 to 11, other suitable means may be employed for this purpose, such as for example, the rubber hinge member illustrated in Fig. 12 of the drawings. In this construction, the rubber member which is designated by the numeral 53, has been molded into a substantially L-shaped form and then the legs thereof adhesively united to the interior surfaces of the abutting ends of the lower base section 35' and the upper section 36'. In the normal condition of such parts, the tension of the member 53 maintains the abutting edges of the said sections in contact with each other as is indicated by the dotted outline of the upper section 36' inclining towards the right, as viewed in Fig. 12. When the base member 35' is connected to the rear bumper, in the manner described with respect to section 35, and the upper end of the section 36' is in engagement with the trunk door of the car, such sections assume the positions shown in full lines in such figure, the added tension in the rubber member 53 serving to maintain such engagement at all times. As is indicated by the dot and dash outline of the upper section 36' inclining to the left in Fig. 12, however, such section may be pivoted out of the way of the trunk door to enable opening of the latter and to support the same in its opened condition in the same manner as the embodiment illustrated in Fig. 8. While in Fig. 12 I have shown the lower leg of the rubber member 53 positioned above the upper transverse bracket 16' by which the lower section is attached to the rear bumper, it will be understood that such leg of the rubber member may extend below such bracket and formed to function as a cushion member between the lower section 35' and the bumper in the same manner as the cushion members 21 and 21' illustrated in Figs. 2 and 9 of the drawings, respectively. It will also be understood that the legs of the rubber member 53 may first be adhesively attached to holders and such holders then subsequently secured in the abutting ends of the sections 35' and 36' in any suitable manner.

I claim:

1. In the combination of a vehicle having a horizontally disposed bumper, a vertically disposed bumper, and means for supporting the upper end of said vertical bumper for normal contact against a transverse portion of the body of said vehicle; said means comprising a resilient cushioning member extending between said upper end and an opposed surface of said body and being absorbent of compressive stresses while at the same time being movably mounted to provide a sliding contact between said upper end and said opposed surface, said end, during its sliding motion, serving as a pivot upon which the lower portion of the vertical bumper moves toward the body of the vehicle on coming into contact with an object at the level of said horizontal bumper.

2. In the combination of claim 1, said member being composed of rubber.

3. In a vehicle, a substantially rigid elongated vertically extending bumper guard, means for mounting the lower end of said guard in the region of said vehicle defined by the horizontally extending bumper thereof for resilient and pivotal movement with respect to the body of said vehicle, and a resilient cushioning member supporting the upper end of said bumper guard in normal contact against a transverse opposed surface of said body, said member being absorbent of compressive stresses while at the same time being movably mounted to provide a sliding contact between said upper end and said opposed surface, said end, during its sliding motion, serving as a pivot upon which the lower portion of the vertical bumper moves toward the body of the vehicle on coming into contact with an object at the level of said horizontal bumper.

4. In a vehicle, a horizontal bumper secured to said vehicle, a substantially rigid elongated vertical bumper, resilient cushioning means for securing the lower end of said vertical bumper to said horizontal bumper and for pivotally urging the upper end of said vertical bumper toward a transverse opposed surface of the body of said vehicle, and a resilient cushioning member extending between said upper end and said body in normal contact therewith, said member being absorbent of compressive stresses while at the same time being movably mounted to provide a sliding contact between said upper end and said opposed surface, said end, during its sliding motion, serving as a pivot upon which the lower portion of the vertical bumper moves toward the body of the vehicle on coming into contact with an object at the level of said horizontal bumper.

5. In a vehicle, a substantially rigid elongated vertically extending bumper guard, spring means for yieldingly and pivotally securing the lower end of said vertical guard to said vehicle in the region adjacent the horizontal bumper thereof, and a resilient cushioning member supporting the upper end of said guard in normal contact with a transverse opposed surface of the body of said vehicle, said member being absorbent of compressive stresses while at the same time being movably mounted to provide a sliding contact between said upper end and said opposed surface, said end, during its sliding motion, serving as a pivot upon which the lower portion of the vertical bumper moves toward the body of the vehicle on coming into contact with an object at the level of said horizontal bumper.

6. An elongated guard adapted to be secured at its lower end to a portion of an automobile in the region defined by the bumper thereof and extending transversely of such bumper upwardly to a point on the body portion of the car spaced from such bumper, said guard being composed of a lower section and an upper section hingedly connected together, said upper section having secured to its upper end a resilient shock-absorbing member adapted to engage normally a transverse opposed surface of the body portion of the car and being absorbent of compressive stresses while at the same time being movably mounted to provide a sliding contact between said upper end and said opposed surface, said end, during its sliding motion, serving as a pivot upon which the lower portion of the vertical bumper moves toward the body of the vehicle on coming into contact with an object at the level of said horizontal bumper, and means associated with said sections for normally maintaining said shock-absorbing member in engagement with the car and adapted to resist yieldingly movement of said upper section away from the car.

7. An elongated guard adapted to be secured at its lower end to a portion of an automobile in the region defined by the bumper thereof and extending transversely of such bumper upwardly to a point on the body portion of the car spaced from such bumper, said guard being composed of a lower section and an upper section having secured to its upper end a resilient shock-absorbing member adapted to engage normally a transverse opposed surface of the body portion of the car and being absorbent of compressive stresses while at the same time being movably mounted to provide a sliding contact between said upper end and said opposed surface, said end, during its sliding motion, serving as a pivot upon which the lower portion of the vertical bumper moves toward the body of the vehicle on coming into contact with an object at the level of said horizontal bumper, and means associated with said sections for normally maintaining said shock-absorbing member in engagement with the car and adapted to resist yieldingly movement of said upper section away from the car.

WILLIAM C. BROADWELL.